United States Patent
Axblom et al.

(10) Patent No.: US 11,932,196 B2
(45) Date of Patent: Mar. 19, 2024

(54) BELT RETRACTOR WHICH HAS A FORCE-LIMITING DEVICE AND A DECOUPLING DEVICE

(71) Applicant: AUTOLIV DEVELOPMENT AB, Vargarda (SE)

(72) Inventors: Per Axblom, Alingsås (SE); Adrian Bud, Dalsjöfors (SE); Erik Rydsmo, Sollebrunn (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 563 days.

(21) Appl. No.: 17/262,037

(22) PCT Filed: Jul. 25, 2019

(86) PCT No.: PCT/EP2019/070024
§ 371 (c)(1),
(2) Date: Jan. 21, 2021

(87) PCT Pub. No.: WO2020/021003
PCT Pub. Date: Jan. 30, 2020

(65) Prior Publication Data
US 2021/0276510 A1    Sep. 9, 2021

(30) Foreign Application Priority Data

Jul. 26, 2018 (DE) ...................... 10 2018 118 102.7
Mar. 26, 2019 (DE) ...................... 10 2019 107 663.3

(51) Int. Cl.
*B60R 22/28* (2006.01)
*B60R 22/34* (2006.01)

(52) U.S. Cl.
CPC .......... *B60R 22/3413* (2013.01); *B60R 22/28* (2013.01); *B60R 2022/287* (2013.01)

(58) Field of Classification Search
CPC ... B60R 22/28; B60R 22/341; B60R 22/3413; B60R 2022/287
See application file for complete search history.

(56) References Cited

U.S. PATENT DOCUMENTS 5,967,442 A    10/1999  Wier
7,240,924 B2 *  7/2007  Kohlndorfer ....... B60R 22/3413
                                                280/807

(Continued)

FOREIGN PATENT DOCUMENTS

DE        19780583 C1    1/2001
DE    102008041510 A1    3/2010
(Continued)

*Primary Examiner* — Sang K Kim
(74) *Attorney, Agent, or Firm* — DICKINSON WRIGHT PLLC

(57) ABSTRACT

The invention relates to a belt retractor for a seat belt of a motor vehicle, comprising a belt shaft which is rotatably mounted in a housing frame, a profiled head which can be locked relative to the housing frame, and a force-limiting device, wherein the force-limiting device is coupled on the one hand to the profiled head and on the other hand to the belt shaft and wherein the force-limiting device allows a force-limited rotation of the belt shaft relative to the locked profiled head, characterized by an actively releasable decoupling device.

18 Claims, 13 Drawing Sheets

(56) References Cited

U.S. PATENT DOCUMENTS

| | | | | |
|---|---|---|---|---|
| 7,669,794 | B2 * | 3/2010 | Boelstler | B60R 22/3413 |
| | | | | 242/379.1 |
| 8,220,735 | B2 * | 7/2012 | Wang | B60R 22/3413 |
| | | | | 280/805 |
| 2011/0000996 | A1 * | 1/2011 | Wigstrom | B60R 22/3413 |
| | | | | 242/376 |

FOREIGN PATENT DOCUMENTS

| | | | |
|---|---|---|---|
| EP | 1377487 | A1 | 1/2004 |
| EP | 2342100 | A2 | 7/2011 |
| WO | 0076814 | A1 | 12/2000 |
| WO | 2009045132 | A1 | 4/2009 |
| WO | 2015197540 | A2 | 12/2015 |

* cited by examiner

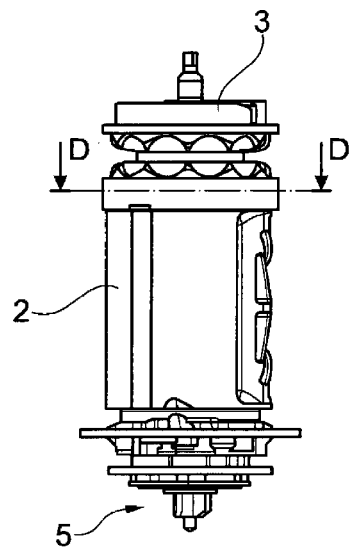
Fig. 18
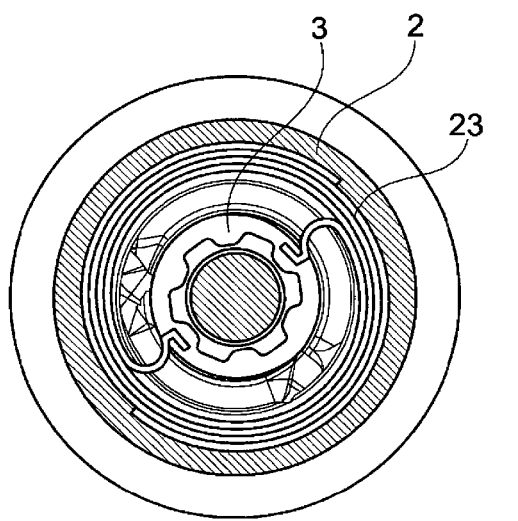 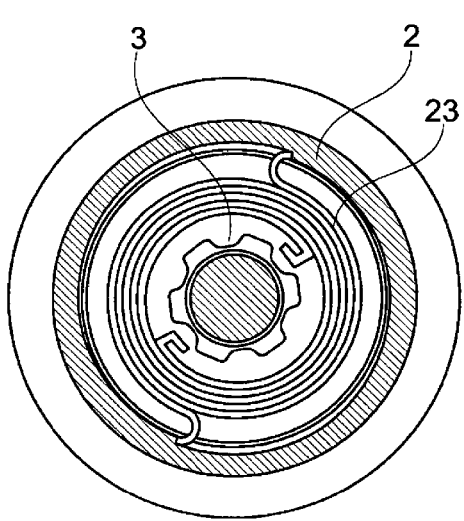
Fig. 19        Fig. 20

BELT RETRACTOR WHICH HAS A FORCE-LIMITING DEVICE AND A DECOUPLING DEVICE

CROSS-REFERENCE TO RELATED APPLICATIONS

This application is a 35 U.S.C. § 371 national phase of PCT International Application No. PCT/EP2019/070024, filed Jan. 25, 2019, which claims the benefit of priority under 35 U.S.C. § 119 to German Patent Application Nos. 10 2018 118 102.7, filed Jul. 26, 2018, and 10 2019 107 663.3, filed Mar. 26, 2019, the contents of which are incorporated herein by reference in its entirety.

FIELD

The present invention relates to a belt retractor for a seat belt of a motor vehicle, comprising a belt shaft which is rotatably mounted in a housing frame, a profiled head which can be locked relative to the housing frame and a multistage first force-limiting device, wherein the first force-limiting device is coupled to the profiled head and secondly to the belt shaft, and wherein the multistage first force-limiting device allows a force-limited rotation of the belt shaft relative to the locked profiled head.

BACKGROUND

A belt retractor with the aforementioned features is known, for example, from DE 197 80.583 C1. The force-limited belt webbing extension can be switched between two stages by means of a switching device. It has now been found that, after reaching the end of the second stage of the force-limited belt webbing extension, forces are introduced into the belt retractor, which under certain circumstances result in uncontrolled further extension of the belt webbing.

SUMMARY

The object of the present invention is therefore to eliminate the disadvantages described with reference to the prior art and in particular to specify a belt retractor, which enables a controlled further belt webbing extension even after reaching the end of the second stage of the force-limited belt webbing extension.

The object is achieved by a belt retractor with the features of the independent claim. Advantageous developments of the belt retractor are specified in the dependent claims and in the description, wherein individual features of the advantageous developments can be combined with one another in a technically sensible manner.

The object is achieved in particular by a belt retractor with the features mentioned at the outset, which has an actively triggerable decoupling device by means of which the belt shaft can be uncoupled from the force limitation of the multistage, preferably precisely two-stage first force-limiting device.

In a simple embodiment, the belt shaft can be freely rotatably mounted to the locked profiled head after the decoupling. However, it is preferred that after the decoupling a further force-limited belt extension takes place, with which energy is absorbed by a force-limiting element of a second force-limiting device without substantial energy absorption taking place by force-limiting elements of the decoupled first force-limiting device.

The basic concept of the invention thus provides that a mechanical device is formed, by means of which, for example, a superordinate control can decouple the belt shaft from the first force-limiting device and thus, in particular, from the profiled head if necessary. In this way, it is possible to prevent elements of the belt retractor from being damaged after reaching one end of the belt webbing extension, which is force-limited by the first force-limiting device, thereby triggering an uncontrolled further belt winding movement. For this purpose, the decoupling device comprises in particular at least one mechanically movable element, which can be actuated at least indirectly by means of an electronically or electrically triggerable drive element, for example in the form of a pyrotechnic gas generator or an electromagnet, within a few milliseconds, so that the belt shaft can rotate freely or force-limited by a second force-limiting device to the locked profiled head.

The first force-limiting device comprises a switching device which can be triggered actively, for example by means of an electromagnet or a pyrotechnic gas generator, by means of which the force-limited relative rotation of the belt shaft can be switched from a first stage to a second stage. The switching device preferably comprises at least one mechanically movable component which can be driven by the drive element. Thus, first two different levels of a force-limited belt extension can be made possible before the belt shaft is uncoupled from the first force-limiting device by means of the decoupling device.

For this purpose, the switching device of the first force-limiting device preferably comprises at least one pawl and one shaft ring, wherein the pawl is held in an initial state by the shaft ring in a position coupling the belt shaft to a first force-limiting element. In the initial state, the pawl, which is preferably pivotably or linearly movably mounted with a self-opening tendency, ensures, for example, that the belt shaft is connected non-rotatably to at least one first transfer tube arranged in particular inside the belt shaft. In this case, it is particularly preferred that a first force-limiting element of the first force-limiting device is coupled to the transfer tube on a first side and is non-rotatably coupled to the profiled head on a second side. In this initial state, when the profiled head is locked to the housing frame with a belt-webbing-sensitive or motor-vehicle-sensitive locking device known per se, the first force-limiting element, preferably configured as a torsion bar, absorbs the energy introduced by the belt webbing extension during a resulting relative rotation of the belt shaft to the locked profiled head.

The switching device preferably comprises an actively triggerable switching drive, wherein after the switching drive has been triggered, the shaft ring is moved by the switching drive in such a way that the at least one pawl is released, so that the belt shaft is coupled to a second force-limiting element of the first force-limiting device. For example, by actuating the switching drive, the previously existing non-rotatable connection of the belt shaft to the first transfer tube is resolved, so that the belt shaft is rotatable relative to the first transfer tube.

In particular, the switching drive for this purpose comprises an adjusting ring and a drive element designed, for example, as a pyrotechnic gas generator, wherein the adjusting ring driven by the drive element displaces the shaft ring axially after the switching drive is triggered. For this purpose, it can be provided, for example, that the adjusting ring is first driven by the drive element into a rotational movement in a housing, wherein the adjusting ring performs, based on starting angles formed in the housing, a linear displacement movement in the axial direction (relative to the belt shaft) in addition to the rotational movement.

After the switching device of the first force-limiting device is triggered, the belt shaft is preferably coupled via a coupling element of the decoupling device to a second force-limiting element of the first force-limiting device, preferably in the form of a second torsion bar, so that a force limitation takes place by deformation of the second force-limiting element during a subsequent belt extension movement. For example, the second torsion bar can likewise be arranged at least partially within the at least one transfer tube and be non-rotatably connected to the first torsion bar with its one side, while the other end of the second torsion bar is coupled to the belt shaft by means of elements of the decoupling device.

The decoupling device comprises in particular at least one coupling element and one shaft ring, wherein the at least one coupling element is held in an initial state by the shaft ring in a coupling position. The coupling element, which is mounted pivotably or radially movably in particular with an opening tendency, is thus initially held in its coupling position by the shaft ring, in which the belt shaft is coupled to a force-limiting element of the first force-limiting device for a force-limited belt webbing extension.

The decoupling device comprises in particular an actively triggerable decoupling drive, wherein the shaft ring is moved by the decoupling drive after the decoupling drive is triggered such that the at least one coupling element is released. For this purpose, it can be provided in particular that the decoupling drive comprises an adjusting ring and a drive element, wherein the adjusting ring driven by the drive element displaces the shaft ring axially after the decoupling drive is triggered. The drive element formed, for example, as an electromagnet or pyrotechnic gas generator can drive the adjusting ring into a rotational movement in a housing, wherein the adjusting ring, in addition to its rotational movement, executes an axial linear movement in the direction of the shaft ring, whereby the shaft ring is displaced from its position holding the coupling elements. After the coupling elements are released by displacing the shaft ring, they can be brought out of their position coupling the belt shaft to the first force-limiting device. For this purpose, the at least one coupling element is preferably wedge-shaped and is mounted so as to be pretensioned radially outward, wherein in the initial state the coupling element engages positively into a force-limiting element of the first force-limiting device, in particular into the end of the second torsion bar of the first force-limiting device. The at least one coupling element is preferably arranged in corresponding recesses in the belt shaft, wherein the positive connection with the force-limiting element takes place on a radially inwardly arranged side of the coupling element.

In a preferred embodiment, the decoupling device is arranged at least partially, in particular with the coupling element, the shaft ring and the adjusting ring, between the belt shaft (and/or on a belt webbing wound up on the belt shaft) and an axially mounted housing cap. In this connection, it is further preferred that the switching device of the first force-limiting device is arranged between the belt shaft (and/or the belt webbing wound up on the belt shaft) and the decoupling device, at least partially, with in particular the pawl, the shaft ring and the switching ring.

The decoupling device is in particular connected in series with a switching device of the first multistage force-limiting device, so that the belt shaft can be decoupled from the first force-limiting device independently of the switching state of the switching device.

In one embodiment, it is additionally provided that a drive of the decoupling device formed in particular as a pyrotechnic gas generator and a drive of a switching device of a multistage first force-limiting device, which is likewise preferably designed as a pyrotechnic gas generator, are arranged in a common housing, so that the belt retractor is compact.

In this connection, it is particularly preferred if the drives are arranged radially offset from one another and in particular the receiving openings for the drives in the common housing overlap one another in the axial direction. The receiving openings for the drives can thus be arranged exactly one above the other in the radial direction, but it is also possible for the receiving openings to be offset in the axial direction to such an extent that they still overlap in the radial direction in projection, as a result of which an even more compact construction is possible.

The common housing is preferably arranged on an end of the belt shaft facing away from the profiled head.

In order that, after decoupling the first force-limiting device from the belt shaft, a further force-limited belt webbing extension is still possible, in particular at a lower force level, a second force-limiting device can be provided, which likewise enables a force-limited relative rotation of the belt shaft relative to the locked profiled head. For this purpose, the second force-limiting device is preferably coupled or can be coupled on the one hand to the profiled head and on the other hand to the belt shaft.

In the embodiment of the first force-limiting device as a two-stage force-limiting device, the second force-limiting device can thus provide a third stage of force-limited belt webbing extension movement.

In this case, it can be provided that a force-limiting element of the second force-limiting device receives energy by means of the first force-limiting device already during the force-limited belt webbing extension and receives energy solely after uncoupling the first force-limiting device. The second force-limiting device is thus coupled to the profiled head and to the belt shaft both before and after decoupling of the belt shaft from the force limitation of the multistage first force-limiting device.

Alternatively, it can be provided that, during a subsequent belt webbing extension, a force-limiting element of the second force-limiting device receives energy from the belt shaft only after the first force-limiting device has been uncoupled from the belt shaft.

The second force-limiting device can be designed and/or arranged in such a way that the force-limiting element of the second force-limiting device remains active or becomes effective after the uncoupling of the first force-limiting device without further action. However, it can also be provided that a force-limiting element of the second force-limiting device can be actively actuated for coupling to the belt shaft by means of a corresponding drive.

The force-limiting element of the second force-limiting device can be formed, for example, as a band which deforms during the force limitation. For this purpose, the band is connected, for example, with its one end to the profiled head and with its other end to the belt shaft, so that the band is deformed when the belt shaft rotates relative to the profiled head. In this case, the band can also be guided through a sliding edge, by means of which the necessary energy for deforming the band is increased. The band is in particular arranged spirally and/or in a multilayered manner.

The force-limiting element of the second force-limiting device can also be formed by a torsion bar which is driven via a gearwheel for torsion. For this purpose, the torsion bar is non-rotatably connected at one end to a first gearwheel which meshes with a second gearwheel. The second gearwheel can, for example, be arranged coaxially with respect to the profiled head, while the torsion bar is arranged rotatably mounted on the belt shaft. When the belt shaft rotates relative to the profiled head, the torsion bar is then twisted by the first gearwheel. Alternatively, it can be provided that the torsion bar coupled to a gearwheel is arranged outside of the belt shaft, wherein the second gearwheel is coupled to the belt shaft, so that the torsion bar mounted in a stationary but rotatable manner is twisted during a rotation of the belt shaft. In this connection, provision can be made in particular for a switching mechanism to be provided, which, if required, engages the first gearwheel with the second gearwheel.

However, a disk arrangement which has in particular radial projections and is preferably annular is also provided as a force-limiting element of the second force-limiting device and is arranged between the belt shaft and the profiled head for energy absorption during a relative rotation therebetween. The disk arrangement has, in particular, two annular disk elements arranged coaxially to one another, wherein the one preferably outer disk element is non-rotatably coupled to the belt shaft, in particular by means of a suitable form-fitting design, and the other preferably inner disk element is non-rotatably coupled to the profiled head, in particular by means of a suitable form-fitting design. In the case of a rotation of the belt shaft relative to the profiled head, the two disks are moved relative to one another, whereby energy is absorbed in particular by friction, elastic and/or plastic deformation of one or both disk elements. For this purpose, the inner disk element can have a projection design on its outer circumference and the disk outer element on its inner circumference has a recess design which is complementary to the projection design and which engage with one another in the initial state and generates friction and/or is deformed during a relative rotation.

However, a force-limiting element of the second force-limiting device can also be formed by a torsion bar which is arranged directly one behind the other and/or in series with the force-limiting elements of the multistage first force-limiting device preferably embodied as torsion bars. Here, it can be provided in particular that a first end of the torsion bar of the second force-limiting device is coupled in particular directly non-rotatably to a torsion bar of the first force-limiting device acting as a second force-limiting element and secondly is coupled in particular directly non-rotatably to the belt shaft.

In this connection, it is also provided that the first force-limiting device has a second transfer tube, which is non-rotatably coupled to the second force-limiting element of the first force-limiting device and on the other hand is initially coupled to the belt shaft by means of the decoupling device. The second transfer tube can be arranged at least partially within the first transfer tube, which in turn is non-rotatably coupled to the first force-limiting element of the first force-limiting device and on the other hand is initially non-rotatably coupled to the belt shaft via the switching device of the first force-limiting device.

It is more specifically provided that the force level of the first torsion bar formed as the first force-limiting element is larger than the force level of the torsion bar formed as the second force-limiting element of the of the first force-limiting device, while the level of force of the torsion bar of the second force-limiting device is lower than the force-limiting elements of the first force-limiting device.

In the initial state, the belt shaft is thus non-rotatably connected via the switching device to the first transfer tube and via the decoupling device to the second transfer tube, while the torsion bar of the second force-limiting device is likewise non-rotatably connected to the belt shaft. If the profiled head is now locked, then at a first stage of the force limitation, solely a twisting of the first torsion bar takes place.

By actuating the switching device, the non-rotatable connection between the belt shaft and the first transfer tube is disconnected, so that the second transfer tube rotates together with the belt shaft relative to the profiled head, so that in this stage the second torsion bar is twisted due to its lower level of force than the first torsion bar.

By actuating the decoupling device, the non-rotatable connection of the belt shaft to the second transfer tube is then also released, so that a rotation of the belt shaft relative to the first and second transfer tube is possible during further belt webbing extension. However, since the torsion bar of the second force-limiting device is non-rotatably coupled to the belt shaft, the torsion bar of the second force limiting device is twisted in the event of a further belt webbing extension, since this torsion bar has a lower force-limiting level than the torsion bars of the first force-limiting device. A simple three-stage force-limited belt webbing extension is thus possible.

BRIEF DESCRIPTION OF THE DRAWINGS

The invention and the technical environment are explained below by way of example with reference to the figures. The figures show schematically

FIG. 18: a plan view of a fourth embodiment with a deformable band as a force-limiting element of a second force-limiting device, FIG. 19: a sectional view through the embodiment of FIG. 18 in the region of the band in the initial state, FIG. 20: the view of FIG. 19 at the end of the force limitation.

DETAILED DESCRIPTION

Figure 1:
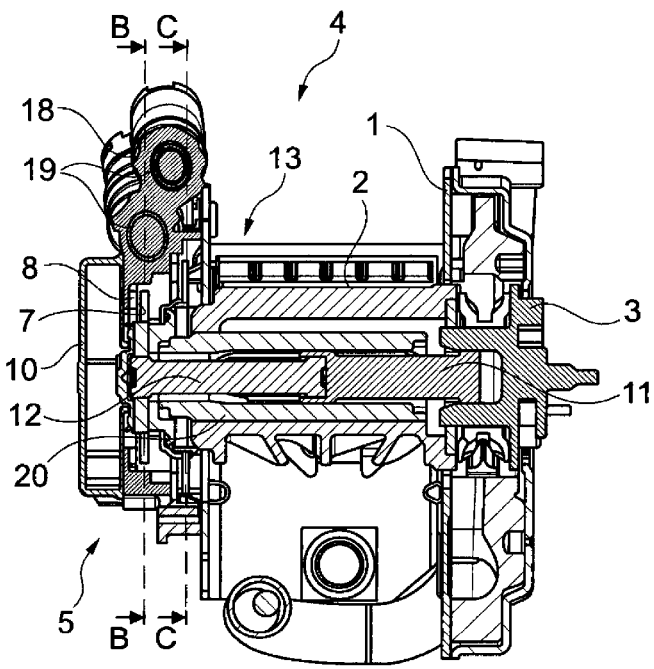
FIG. 1: a longitudinal section through a belt retractor in an initial state.
Figure 2:
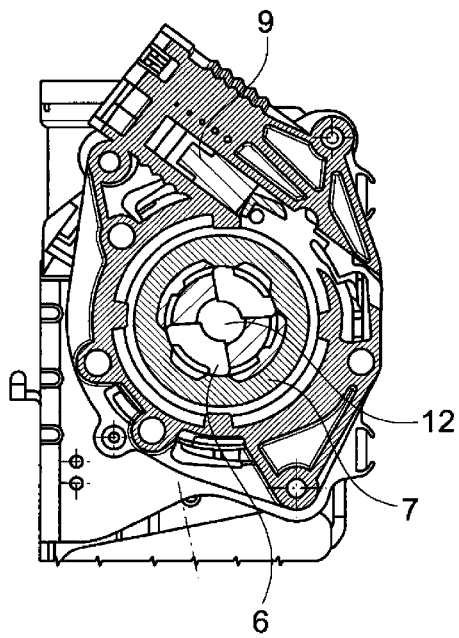
FIG. 2: a cross-section (B-B) of FIG. 1 provided by the belt retractor.
Figure 3:
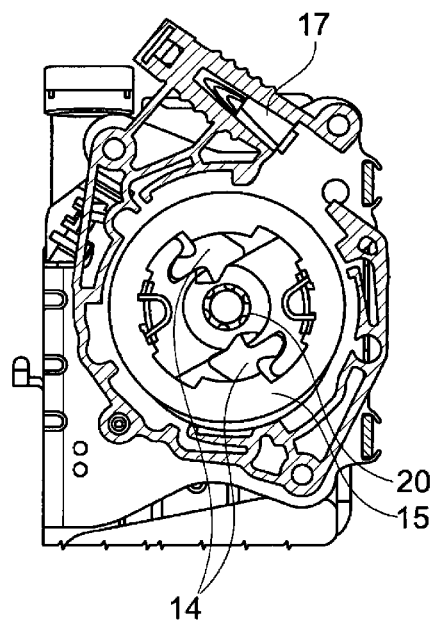
FIG. 3: a further cross section (C-C) of FIG. 1 through the belt roller.

The belt retractor shown in FIG. 1 to 13 comprises a housing frame 1 in which a belt shaft 2 is rotatably mounted.

The belt retractor comprises a two-stage first force-limiting device 4 via which the belt shaft 2 is coupled to a profiled head 3 in a first force-limiting stage and in a second force-limiting stage.

For this purpose, the first force-limiting device 4 comprises a switching device 13 which has two pawls 14, a shaft ring 15, an adjusting ring 16, and a drive element 17 in the form of a gas generator. In the initial state shown in FIG. 1 to 5 the pawls 14 pivotably mounted with a self-opening tendency are held by the shaft ring 15 in a coupling position, in which the belt shaft 2 is non-rotatably coupled to a transfer tube 20.

A first force-limiting element 11 in the form of a torsion bar and a second force-limiting element 12 in the form of a further torsion bar are arranged inside the transfer tube 20. The first force-limiting element 11 is non-rotatably coupled to the profiled head 3 on the one hand and on the other hand is non-rotatably connected thereto in the interior of the transfer tube 20. On the one hand, the second force-limiting element 12 is non-rotatably connected to the first force-limiting element 11 and on the other hand in the initial state shown in FIG. 1 to 5 is non-rotatably connected to the belt shaft 2 via a coupling element 6 of a decoupling device 5.

The decoupling device 5 further comprises a shaft ring 7, which in the initial state holds the radially outwardly pre-tensioned coupling elements 6 in the coupling position. The decoupling device 5 additionally comprises an adjusting ring 8, which can be driven by means of a drive element 9 in the form of a gas generator.

The drive element 9 of the decoupling device 5 and the drive element 17 of the switching device 13 are arranged in a common housing 18, wherein the housing 18 in each case has a receiving opening 19 for the drive elements 9, 17. The receiving openings 19 are offset relative to one another in the radial direction with respect to the belt shaft 2 but overlap in the axial direction, as can be seen in particular from FIG. 1.

Figure 4:
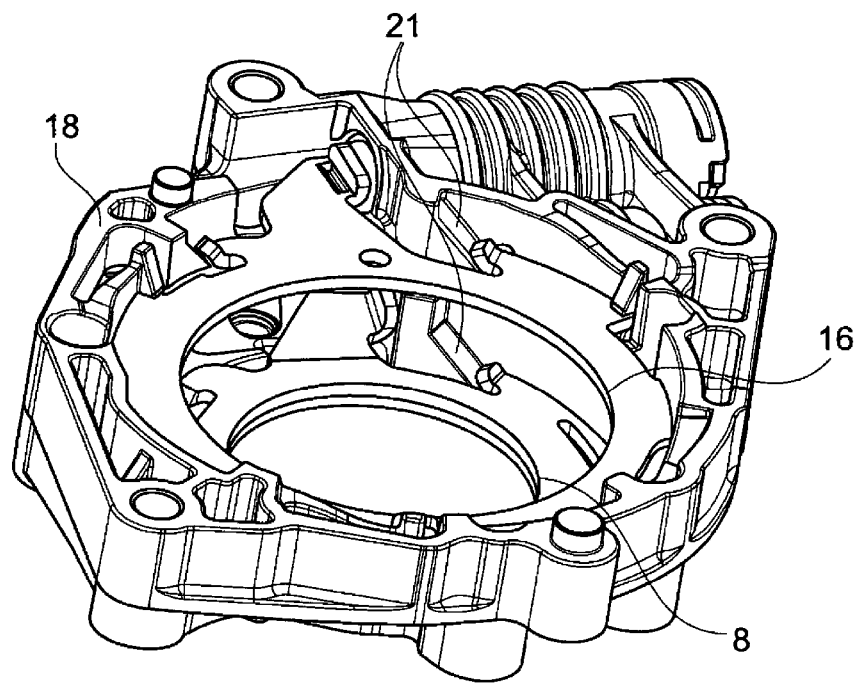
FIG. 4: components of the belt retractor according to FIG. 1.
Figure 5:
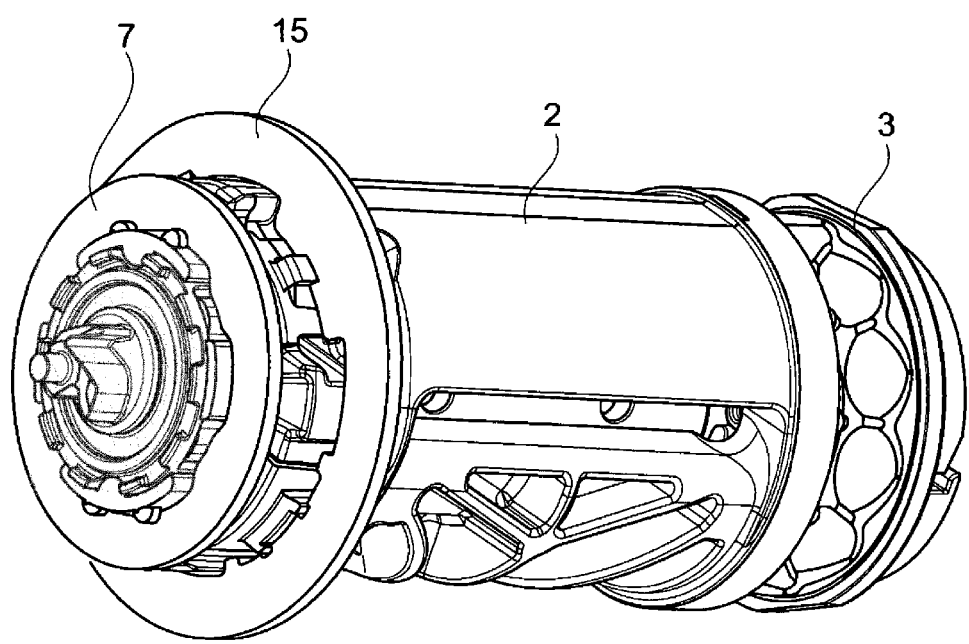
FIG. 5: further components of the belt retractor included in FIG. 1 in the initial state.

It can be seen from FIG. 4 that the adjusting ring 8 which can be driven by the drive element 9 into a rotational movement and the adjusting ring 16 which can be driven by the drive element 17 into a rotational movement, each rest against a starting angle 21, so that the rotational movement of the adjusting rings 8, 16 caused by the drive elements 9, 17 results in a displacement movement in the axial direction of the belt shaft 2.

The decoupling device 5 is arranged at least partially between the switching device 13 and a housing cap 10.

In the initial state shown in FIG. 1 to 5 the belt shaft 2 is non-rotatably connected to the profiled head 3 via the pawls 14, the transfer tube 20, and the first force-limiting element 11, so that the belt shaft 2 and the profiled head 3 can perform a rotary movement jointly. If the profiled head 3 is now locked to the housing frame 1 by means of a locking device, which is not shown but known per se, a force-limited belt extension rotation of the belt shaft 2 is possible, with which the first force-limiting element 11 is twisted with the belt shaft 2 due to the coupling present via the transfer tube 20 and the pawls 14 and thus absorbs energy (first force-limiting level).

Figure 6:
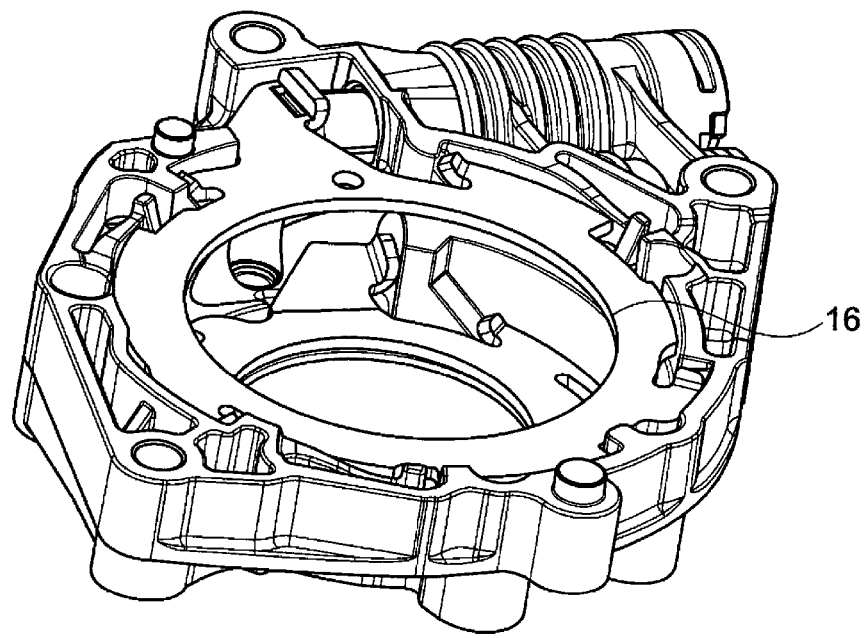
FIGS. 6-9: the belt retractor after actuating a switching device with a changed force-limiting level.
Figure 7:
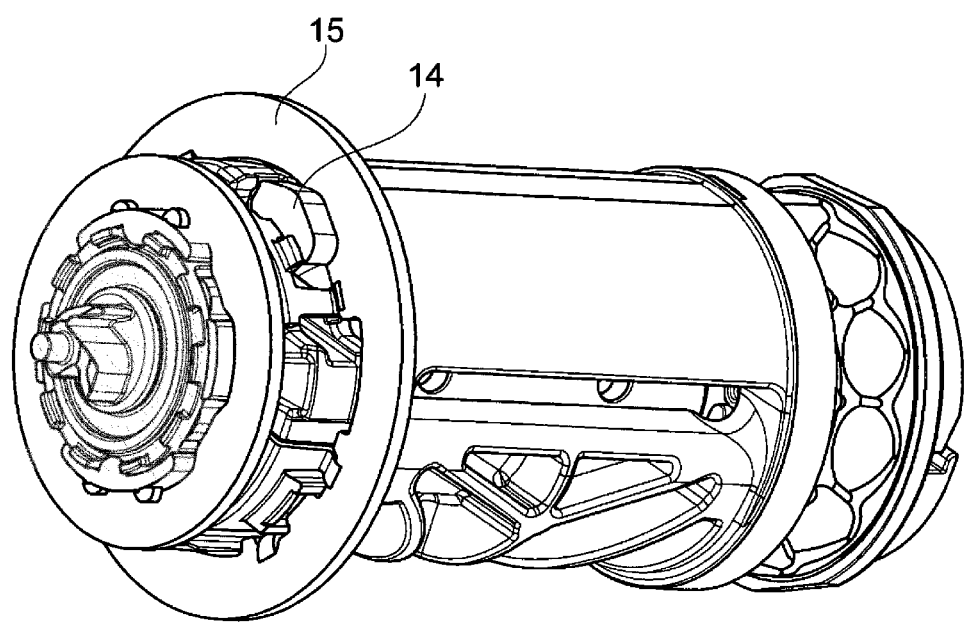
Figure 8:
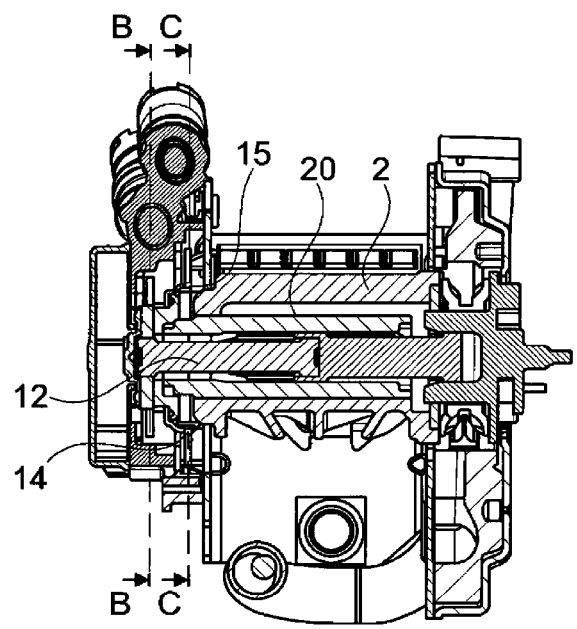
Figure 9:
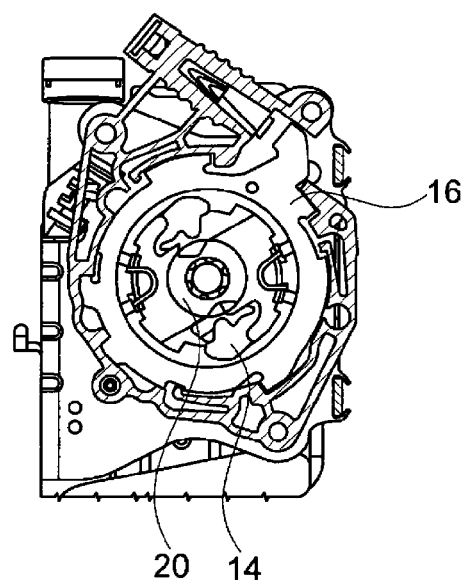
Figure 10:
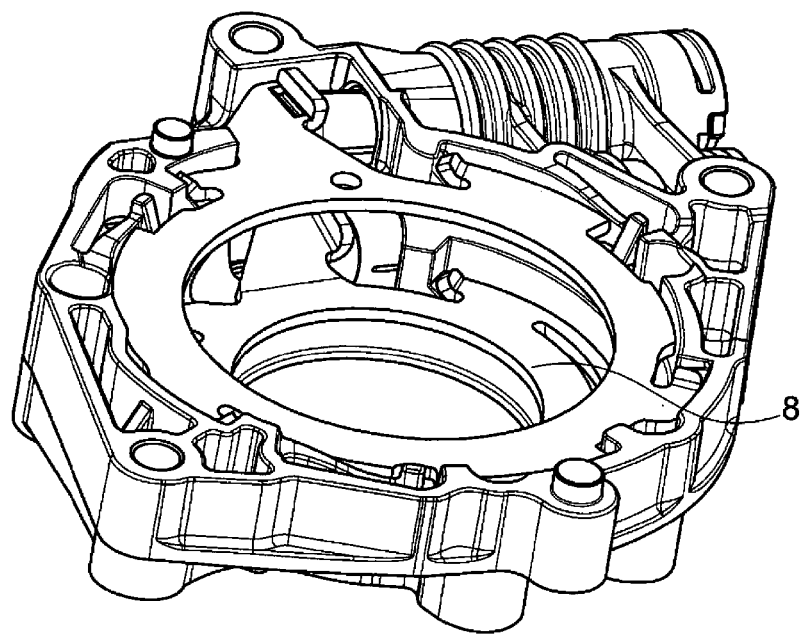
FIGS. 10-13: the force retractor after actuating a decoupling device in a decoupling state.
Figure 11:
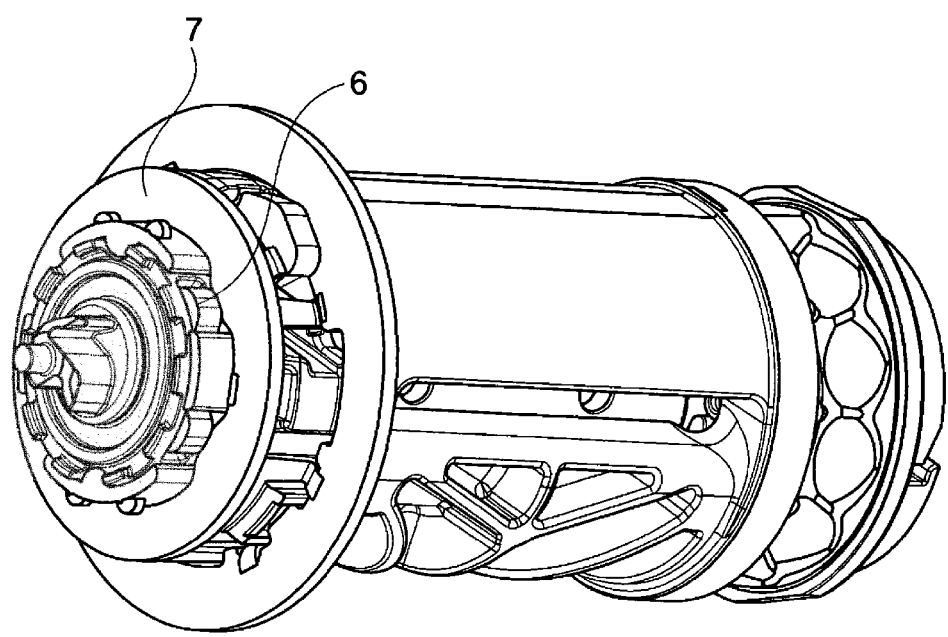
Figure 12:
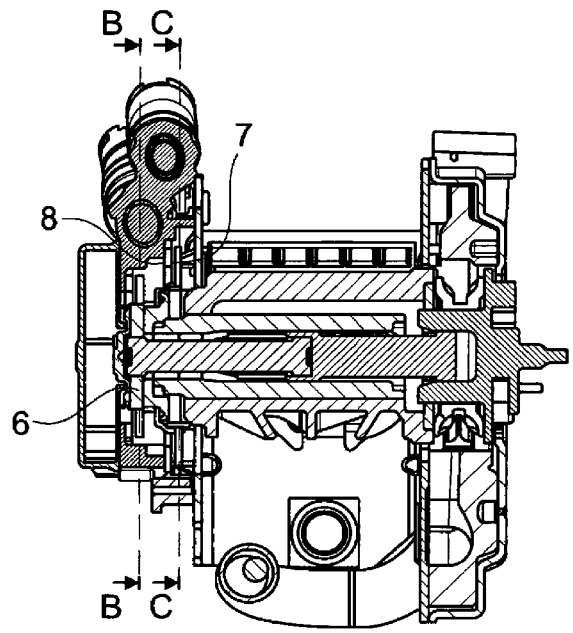
Figure 13:
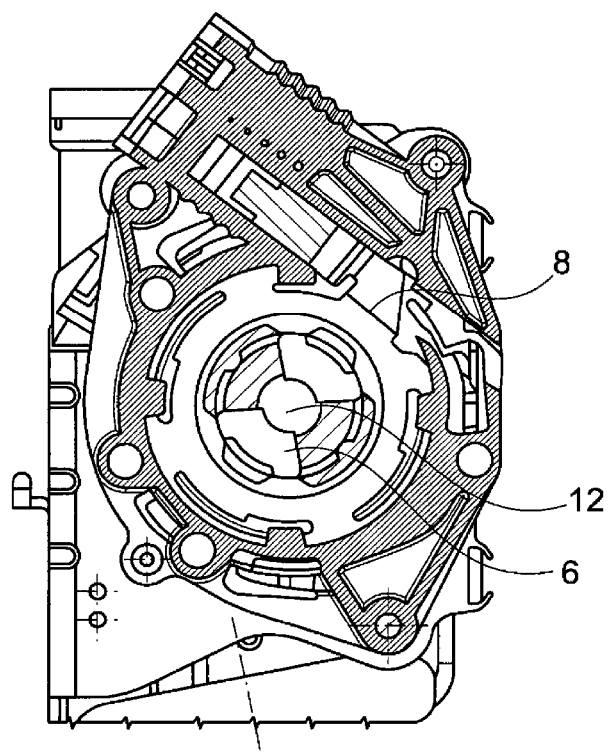

If a second stage of the force-limited belt webbing extension movement is to be initiated after reaching a specifiable time or a specifiable force-limited belt webbing extension movement, the drive element 17 is ignited in the form of a pyrotechnic gas generator, whereby a piston drives the adjusting ring 16 to rotate. Due to the starting angles 21 on the housing 18, the adjusting ring 16 is displaced axially, as shown in FIG. 6. The axial displacement of the adjusting ring 16 results in the shaft ring 15 also being displaced axially (see FIGS. 7 and 8), whereby the pawls 14 are released. The pawls 14 thus release the non-rotatable coupling between the belt shaft 2 and the transfer tube 20, so that the belt shaft 2 is rotatable relative to the transfer tube 20. In this second stage of the force-limited belt webbing extension movement, however, there continues to be a non-rotatable connection between the belt shaft 2 and the second force transmission element 12 by means of the coupling elements 6. Since the second force-limiting element 12 has a lower force-limiting level than the first force-limiting element 11, a twisting of the second force-limiting element 12 occurs.

If a maximum force-limited belt webbing extension is now achieved, the belt shaft 2 can be uncoupled from the profiled head 3. For this purpose, the drive element 9 of the decoupling device 5 is ignited, whereby the adjusting ring 8 is driven into a rotational movement which, on account of the starting angles 21, leads to a displacement of the adjusting ring 8 in the axial direction (see FIGS. 10 and 12). Due to the axial displacement of the adjusting ring 8, the shaft ring 7 of the decoupling device 5 is also displaced linearly in the axial direction (see FIG. 11), as a result of which the wedge-shaped coupling elements 6 are released and extend radially outward. As can be seen in particular from FIG. 13, in this state the coupling of the belt shaft 2 to the second force-limiting element 12 is canceled, so that the belt shaft 2 is no longer connected to the locked profiled head 3 and can rotate freely.

Figure 14:
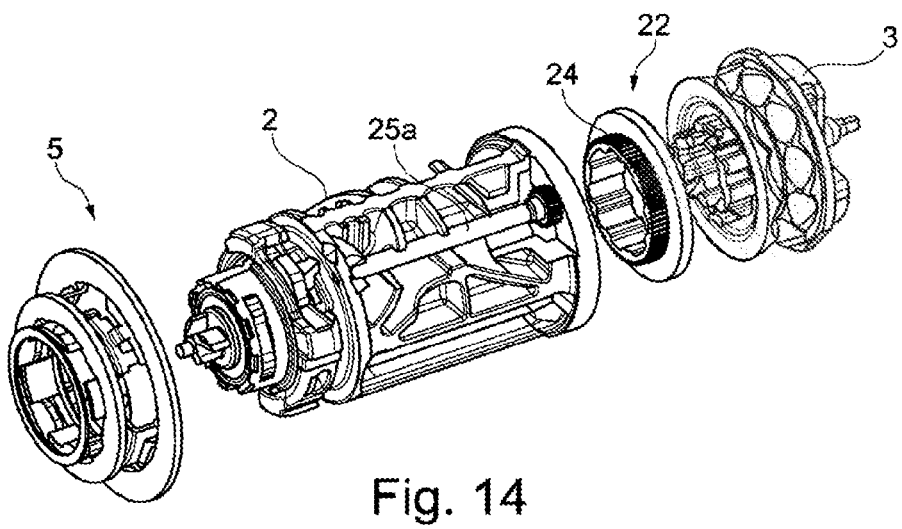
FIG. 14: a partial exploded view of a second embodiment of a belt retractor with a torsion bar of a second force-limiting device drivable by means of a gearwheel.
Figure 15:
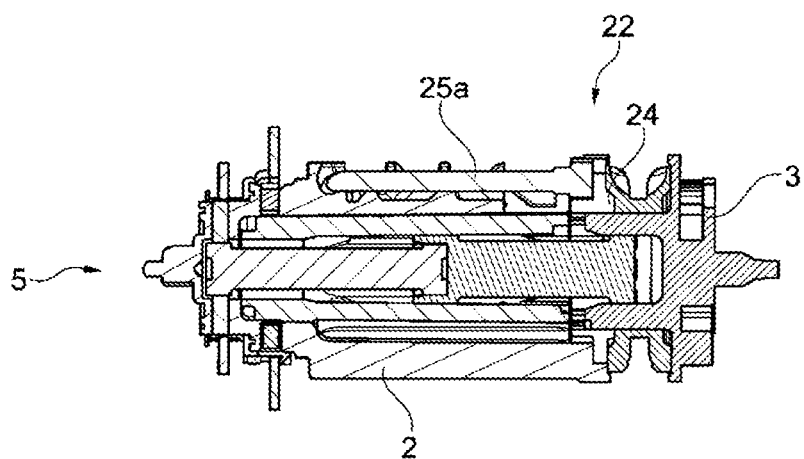
FIG. 15: a sectional view through the embodiment of FIG. 14.

The belt retractor shown in FIGS. 14 and 15 differs from the belt retractor described above in that a gearwheel 24 is non-rotatably coupled to the profiled head 3 and that a torsion bar 25a is provided, which likewise carries at its end a gearwheel which meshes with the toothed wheel 24 in the assembled state. When the belt shaft 2 rotates relative to the profiled head 3, the torsion bar 25a is thus twisted. The torsion bar 25a is thus also coupled to the profiled head 3 after the decoupling device 5 is actuated, so that a force-limited belt webbing extension of the belt is possible even after the decoupling device 5 has been actuated. A second force-limiting device 22 is thus formed in addition to the multistage first force-limiting device 4 already explained above.

Figure 16A:
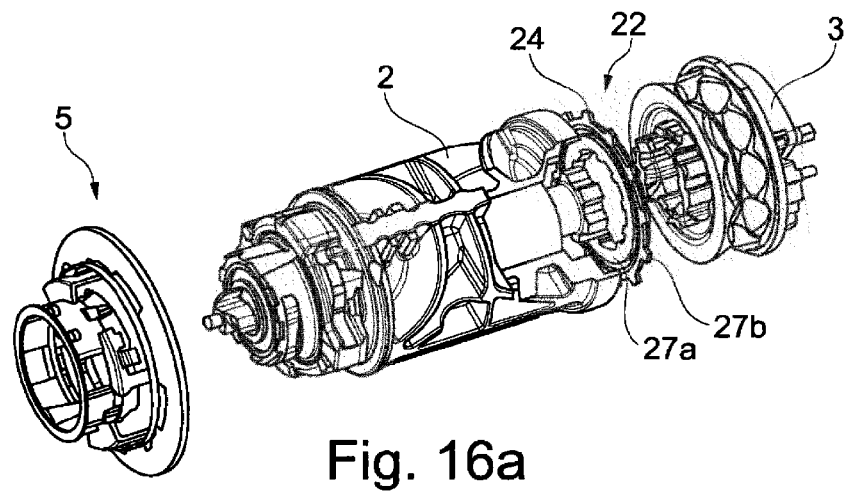
FIG. 16*a*: a partial exploded view of a third embodiment with a disk arrangement as a force-limiting element of a second force-limiting device.
Figure 16B:
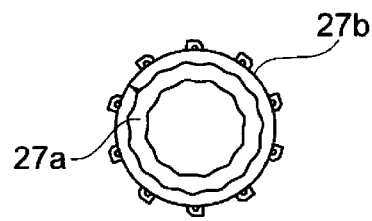
FIG. 16*b*: the disk arrangement from FIG. 16*a* in plan view.
Figure 17:
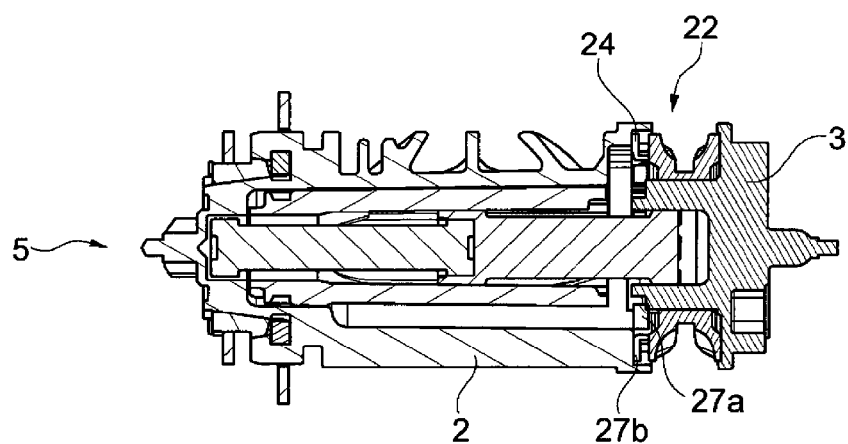
FIG. 17: a sectional view of FIG. 16 according to the embodiment.

In the embodiment illustrated in FIGS. 16 and 17, a second force-limiting device 22 is formed by a disk arrangement 24 with radial recesses. The disk arrangement 24 includes an outer disk element 27b and an inner disk element 27a. The outer disk element 27b is non-rotatably coupled to the belt shaft 2 by means of a suitable form-fitting design.

The inner disk element 27a is non-rotatably coupled to an extension of the profiled head 3 by means of a suitable form-fitting design. The inner disk element 27a has a projection design on its outer circumference and the outer disk element 27b on the inner circumference thereof has a recess design complementary to the projection design. The protrusion design and the recess design engage with each other in the initial state. During a relative rotation of the belt shaft 2 relative to the profiled head 3, the return design and/or the projection design are elastically and/or plastically deformed, whereby energy is absorbed.

In the embodiment shown in FIG. 18 to 20, a second force-limiting device 22 is formed by a band 23. The band 23 is connected on the one hand to the belt shaft 2 and on the other hand to the profiled head 3. If a relative rotation occurs between the belt shaft 2 and the profiled head 3, the belt is deformed from the state shown in FIG. 19 into the state shown in FIG. 21, as a result of which the belt webbing extension is force-limited.

Figure 21:
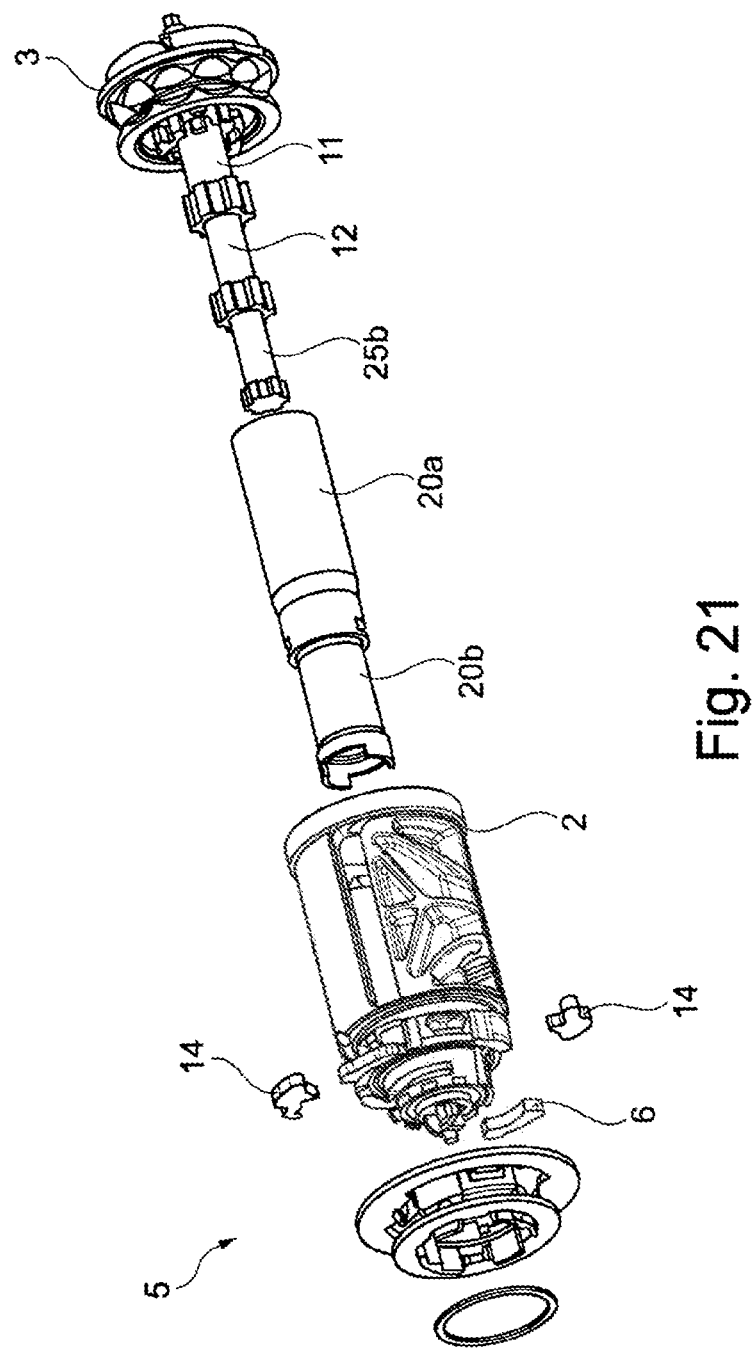
FIG. 21: a partial exploded view of a fifth embodiment with a torsion bar of a second force-limiting device connected in series with the force-limiting elements of the first force-limiting device.
Figure 22:
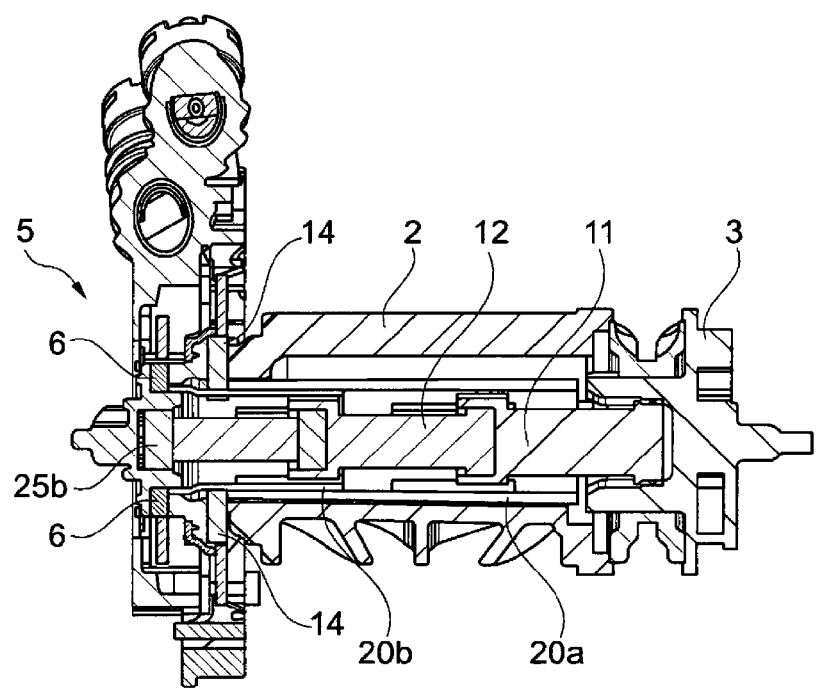
FIG. 22: a sectional view through the embodiment according to FIG. 21.

In the embodiment shown in FIGS. 21 and 22, a second force-limiting device 22 is formed by a torsion bar 25b, which is arranged in series with the first force-limiting element 11 and the second force-limiting element 12 of the first force-limiting device 4. In this embodiment, a first transfer tube 20a and a second transfer tube 20b are provided, which are at least partially interlocked in the assembled state. As can be seen in particular from FIG. 22, the first force-limiting element 11 is non-rotatably connected to the profiled head 3 on the right side and is non-rotatably connected to the first transfer tube 20a at its left end. The second force-limiting element 12 is non-rotatably connected to the first force-limiting element 11 on its right side and non-rotatably connected to the second transfer tube 20b on its opposite end. On the other hand, the torsion bar 25b is non-rotatably connected to the second force-limiting element 12 at its right end and is rotatably fixed to the belt shaft 2 at its left end.

The connection of the force-limiting elements (25b, 11, 12) to one another or the connection to the transfer tubes (20a, 20b) can be effected by corresponding inner and outer contours, which are designed, for example, as internal and fixed toothings. In this case, these are inserted into one another and installation space is thus saved. This is shown by way of example in FIG. 22.

Figure 24A:
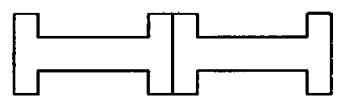
FIG. 24a: examples of connection of force-limiting elements.
Figure 24B:
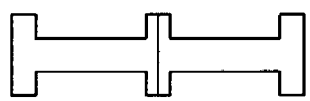
FIG. 24b: another example of a connection of the force-limiting elements with reduced installation space.
Figure 24C:
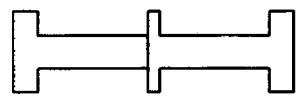
FIG. 24c: another example of a connection of the force-limiting elements with reduced installation space.

Alternatively, the parts may be joined together by friction welding, adhesive bonding or soldering. FIG. 24 shows various possibilities of how the force-limiting elements can be connected to one another. FIG. 24a shows a connection, for example friction-welding, of the force-limiting elements (25b, 11, 12), with which the force-limiting elements are connected to one another at their end faces. As shown in FIG. 24b, the end sections of the respective elements can be made thinner or, as illustrated in FIG. 24c, the section of a force-limiting element (25b, 11, 12) to be twisted can be welded directly to the end face of a force-limiting element (25b, 11, 12). Both embodiments of FIGS. 24b and 24c result in a smaller installation space for the arrangement of the force-limiting elements.

In an initial state, the belt shaft 2 is non-rotatably connected to the first transfer tube 20a via the pawls 14 and is non-rotatably connected to the second transfer tube 20b via the coupling elements 6. If a relative rotation of the belt shaft 2 now occurs after a locking of the profiled head 3, then firstly only the first force-limiting element 11 is twisted with the belt shaft 2 due to its coupling via the pawls 14 and the first transfer tube 20a (first force-limiting level). As soon as the switching device brings the pawls 14 into engagement with the first transfer tube 20a, a twisting of the second force-limiting element 12 takes place within the scope of the second force-limiting level, since these are connected via the coupling elements 6 to the rotating belt shaft 2 which rotates relative to the first transfer tube 20a. Since the force-limiting level of the second force-limiting element 12 is less than the force-limiting level of the first force-limiting element 11, only the second force-limiting element 12 twists.

When the decoupling device 5 is actuated, the non-rotatable connection from the second transfer tube 20b to the belt shaft 2 is also released, so that a rotation of the belt shaft 2 relative to the second transfer tube 20b is possible. This results in a twisting of the torsion bar 25b, since its force level is smaller than the force levels of the second force-limiting element 12 and the first force-limiting element 11. A belt webbing extension is thus effected at a third force level.

Figure 23:
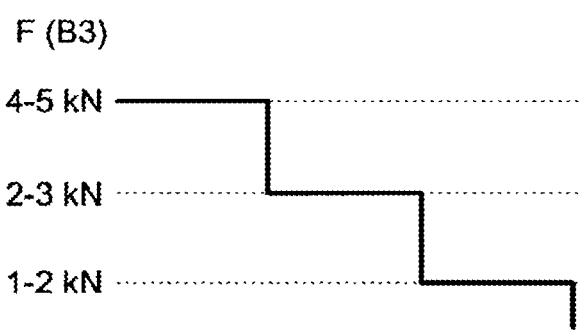
FIG. 23: a representation of a force profile with three force levels.

The time profile of the three-stage belt webbing extension with three force levels is shown in FIG. 23. After the profiled head 3 has been locked, a belt webbing extension at a first force level of, for example, 4-5 kN takes place first. After actuation of the switching device 13, a belt webbing extension is effected at a second force level of 2-3 kN, for example. After actuation of the decoupling device 5 a belt webbing extension is effected at a third force level of for example 1-2 kN.

While the above description constitutes the preferred embodiment of the present invention, it will be appreciated that the invention is susceptible to modification, variation and change without departing from the proper scope and fair meaning of the accompanying claims.

The invention claimed is:

1. A belt retractor for a seat belt of a motor vehicle having a belt shaft rotatably mounted in a housing frame,
a profiled head which can be locked in relation to the housing frame; and
a multistage first force-limiting device, wherein the multistage first force-limiting device is coupled on the one hand to the profiled head and on the other hand to the belt shaft, and wherein the multistage first force-limiting device allows a force-limited rotation of the belt shaft relative to the locked profiled head,
wherein an actively triggerable decoupling device is formed such that the belt shaft can be uncoupled from the force limiter of the multistage first force-limiting device by the decoupling device,
wherein the decoupling device comprises at least one coupling element and one shaft ring, and
wherein the at least one coupling element is held in an initial state radially outward by the one shaft ring in a coupling position.

2. The belt retractor according to claim 1, wherein a second force-limiting device is provided, wherein the second force-limiting device allows a force-limited rotation of the belt shaft relative to the locked profiled head.

3. The belt retractor according to claim 2, wherein the second force-limiting device is coupled to the multistage first force-limiting device and to the belt shaft both before and after decoupling of the belt shaft from the force limitation of the multistage first force-limiting device.

4. The belt retractor according to claim 2, wherein the second force-limiting device comprises at least one force limiting-element of the following group:
a band which deforms during the force limitation,
a torsion bar driven for torsion via a gearwheel,
a disk arrangement comprising in particular two disk elements, a torsion bar arranged directly in series with the force-limiting elements of the multistage first force-limiting device.

5. The belt retractor according to claim 1, wherein the decoupling device comprises an actively triggerable decoupling drive and, after the decoupling drive has been triggered, the shaft ring is moved by the decoupling drive in such a way that the at least one coupling element is released.

6. The belt retractor according to claim 5, wherein the decoupling drive comprises an adjusting ring and a drive element, wherein the adjusting ring driven by the drive element axially displaces the shaft ring after the decoupling drive is triggered.

7. The belt retractor according to claim 1, wherein the at least one coupling element is wedge-shaped and is mounted so as to be pretensioned radially outward and engages in the coupling position in a positively locking manner in a force-limiting element of a second force-limiting device.

8. The belt retractor according to claim 1, wherein the decoupling device is arranged at least partially in the axial direction between a belt webbing wound onto the belt shaft and an axially mounted housing cap.

9. The belt retractor according to claim 1, wherein the multistage first force-limiting device comprises an actively triggerable switching device such that the switching device is configured to switch to a second stage from a first stage by the force-limited relative rotation of the belt shaft.

10. The belt retractor according to claim 9, wherein the switching device comprises at least one pawl and one shaft ring, wherein the pawl is held in an initial state by the shaft ring in a position coupling the belt shaft to a second force-limiting element of the multistage first force-limiting device.

11. The belt retractor according to claim 10, wherein the switching device comprises an actively triggerable switching drive, and after the switching drive has been triggered, the shaft ring is moved by the switching drive in such a way that the at least one pawl is released, so that the belt shaft is coupled to the second force-limiting element of the multistage first force-limiting device.

12. The belt retractor according to claim 11, wherein the switching drive comprises an adjusting ring and an drive element, wherein the adjusting ring driven by the drive element displaces the shaft ring axially after the switching drive is triggered.

13. The belt retractor according to claim 1, wherein the decoupling device is connected in series with a switching device of the multistage first force-limiting device.

14. The belt retractor according to claim 1, wherein a pyrotechnic drive of the decoupling device and a pyrotechnic drive of a switching device of the multistage first force-limiting device are arranged in a common housing.

15. The belt retractor according to claim 14, wherein the both pyrotechnic drives of the decoupling device and the switching device are arranged radially offset from one another.

16. The belt retractor according to claim 15, wherein receiving openings for the drives in the common housing overlap in the axial direction.

17. The belt retractor according to claim 14, wherein the common housing is arranged on an end of the belt shaft facing away from the profiled head.

18. A belt retractor for a seat belt of a motor vehicle having
- a belt shaft rotatably mounted in a housing frame,
- a profiled head which can be locked in relation to the housing frame; and
- a multistage first force-limiting device, wherein the multistage first force-limiting device is coupled on the one hand to the profiled head and on the other hand to the belt shaft, and wherein the multistage first force-limiting device allows a force-limited rotation of the belt shaft relative to the locked profiled head,
- wherein an actively triggerable decoupling device is formed such that the belt shaft can be uncoupled from the force limiter of the multistage first force-limiting device by the decoupling device,
- wherein the multistage first force-limiting device comprises an actively triggerable switching device such that the force-limited relative rotation of the belt shaft can be switched from a first stage to a second stage, and
- wherein the switching device comprises at least one pawl and one shaft ring, wherein the pawl is held in an initial state by the shaft ring in a position coupling the belt shaft to a second force-limiting element of the multistage first force-limiting device.

* * * * *